April 8, 1958 G. HENRY ET AL 2,829,784
APPARATUS FOR FEEDING GLASS COMPOSITION
TO GLASS MELTING FURNACES
Filed May 18, 1955 2 Sheets-Sheet 2
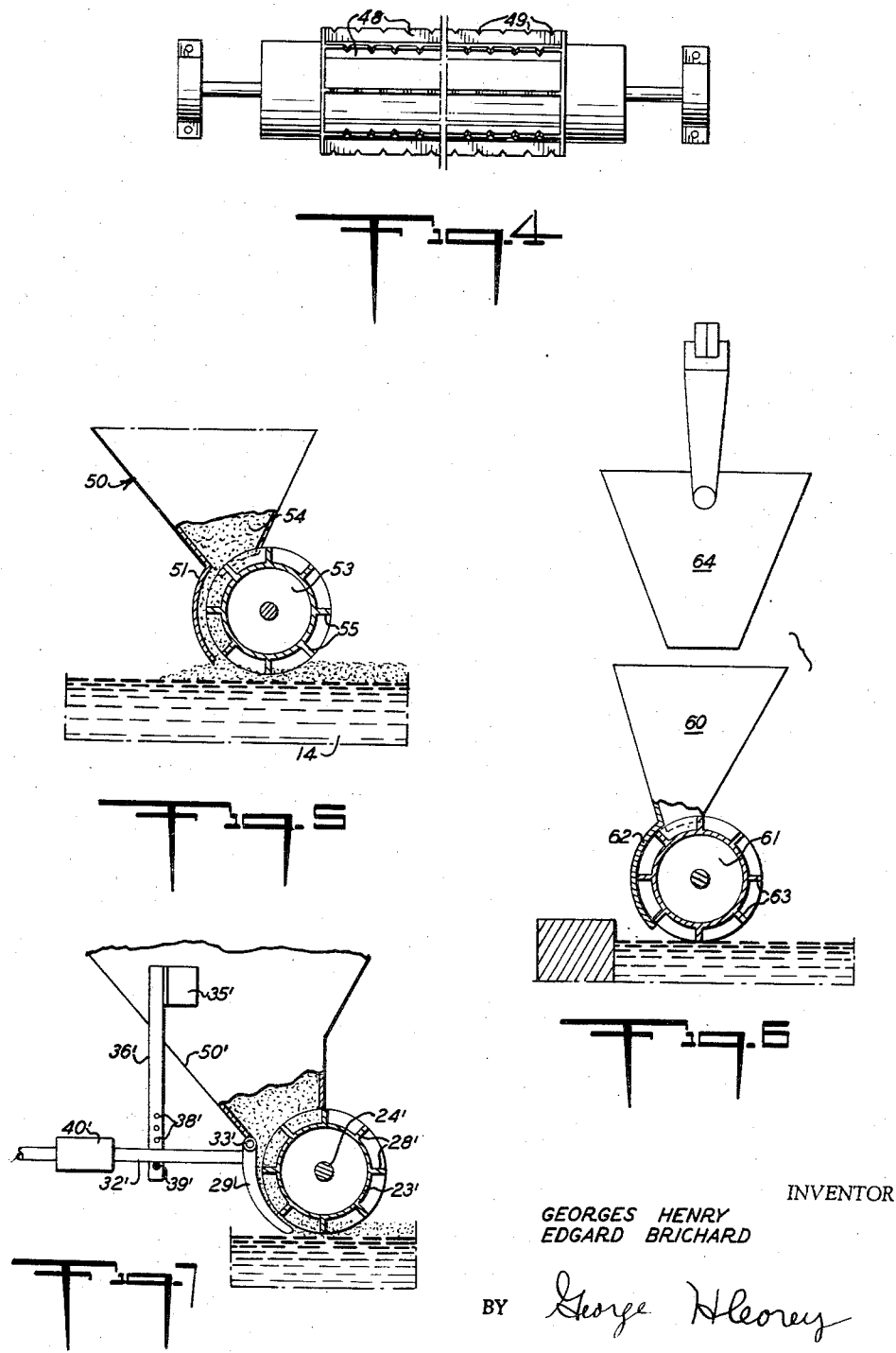
INVENTOR
GEORGES HENRY
EDGARD BRICHARD
BY George Henry
ATTORNEY

United States Patent Office 2,829,784
Patented Apr. 8, 1958

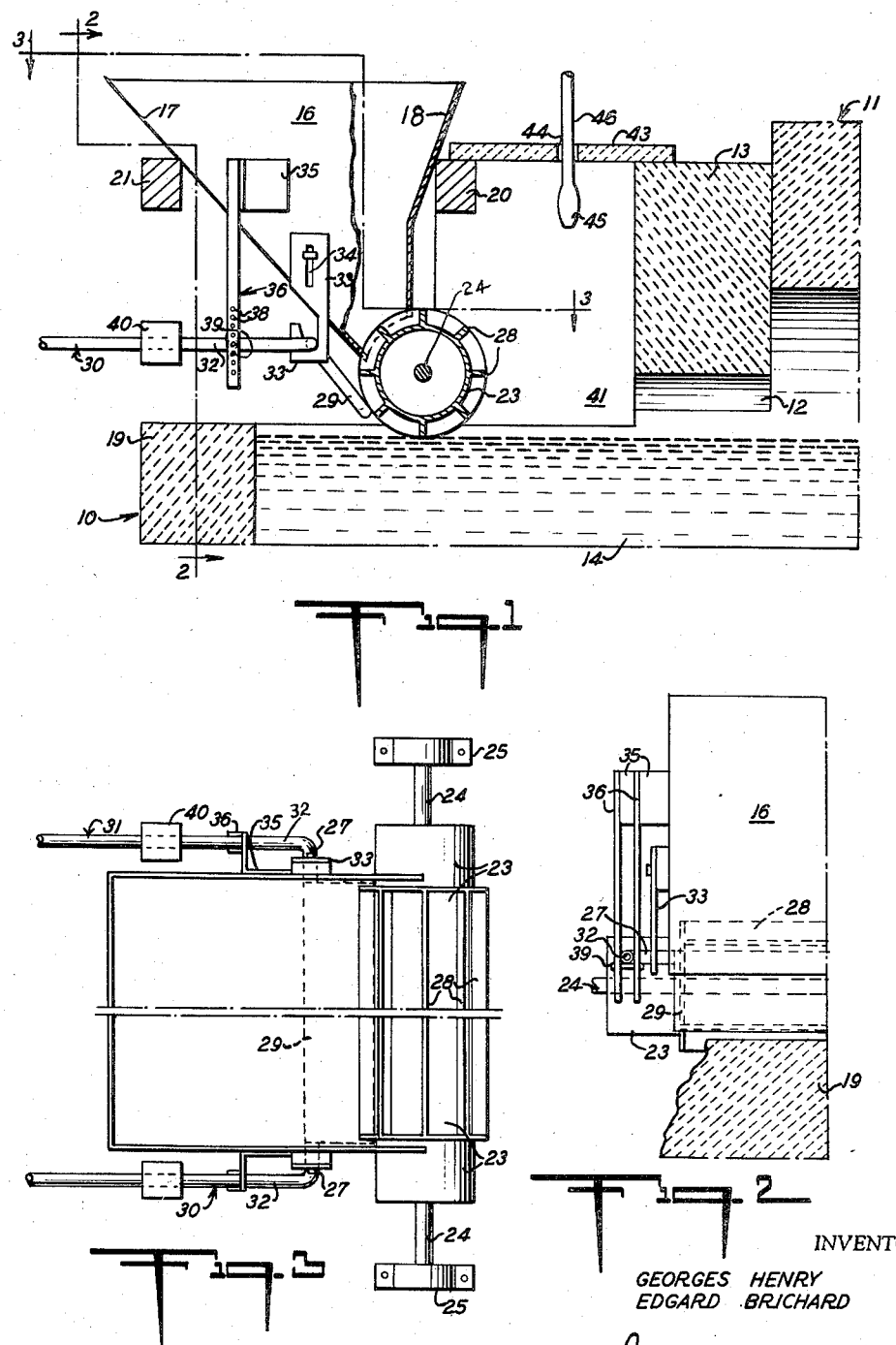

2,829,784

APPARATUS FOR FEEDING GLASS COMPOSITION TO GLASS MELTING FURNACES

Georges Henry and Edgard Brichard, Jumet, Belgium, assignors to Union des Verreries Mecaniques Belges S. A., Charleroi, Belgium, a Belgian company Application May 18, 1955, Serial No. 509,322

Claims priority, application Belgium June 22, 1946

8 Claims. (Cl. 214—18)

This invention relates to new and useful improvements in apparatus for feeding vitrifiable charge materials to glass making furnaces and more particularly to an apparatus whereby the charge materials are fed in a continuous layer of controlled thickness from a forebay extension at the side of the furnace into the melting tank proper.

This application is a continuation-in-part of our co-pending application Serial No. 706,006 filed October 26, 1946, now Patent No. 2,711,837.

As is well understood in the glass making art, when the charge is fed to the furnace from a feeding zone at the end of the furnace wherein a body of molten glass is maintained in direct communication with the molten glass contained in the furnace, the glass in such feeding zone, being removed from the direct influence of the burners supplying heat to the furnace and more or less exposed to the surrounding atmosphere at its surface portions, undergoes a certain amount of cooling with the result that the glass in this zone becomes more dense and a thermal current is set up in such portions outwardly away from the furnace near the surface and then downwardly and reversely toward the furnace at the bottom. The effect of this thermal current must be overcome in feeding a fresh charge into the furnace.

It has generally been the practice heretofore to supply the charge materials in increments of relatively great thickness and these were bodily pushed forward against the normal outward flow of the surface portions of the molten glass in the feeding zone. Where feeders operating with a reciprocating motion were employed, the addition of each successive increment of the charge tended to compress the previous increments of the charge and to increase their thickness and density. The corduroy or parallelly-arranged log effect or appearance of the surface of a charge being fed in this manner is a characteristic well known to glass furnace operators. This effect is, of course, enhanced because of the opposing thermal current.

The charge materials have also been supplied by means of a continuously operating screw feeder or worm operating within a hollow cylinder. With such an arrangement the charge materials are introduced in the form of a relatively large body or rope which extends over only a small part of the surface of the body of molten glass in the forebay and does not lend itself to distribution in a thin, uniform and continuous layer of composition on the body of previously melted glass.

The melting of the charge materials is accelerated and the product obtained is more homogeneous when the charge materials are placed on the surface of the body of molten glass in a very thin, uniform and continuous layer with a corresponding increase in its horizontal expanse on the molten glass. This is explained by the fact that the thinner layer of charge material offers less resistance to the transmission of heat therethrough and by covering a wider expanse effectively utilizes more of the heat radiating from the body of molten glass in the forebay as well as from the furnace proper.

Although it may have been previously recognized that improved melting conditions could be obtained if the charge materials were to be introduced into a glass making furnace in the form of a thin, continuous and uniform layer, it does not appear that anyone prior to ourselves ever achieved a practical method of feeding charge materials in such manner to a glass making furnace. This is no doubt explained by the fact that it is impossible with the feeding means previously employed or by resort to manual feeding to cause the charge materials to move in the form of a thin layer forwardly from a point of introduction in the forebay extension into the glass making furnace counter to the normal outward flow of the glass in the surface portions of the molten glass body therein which is caused by the thermal current that normally occurs within such glass body. The problem is increased due to the greater viscosity of the glass in such surface portions.

It is an object of this invention to overcome the disadvantages of prior systems and apparatus for supplying charge materials to a glass furnace.

It is a further object of this invention to provide apparatus for continuous feeding of charge materials in a controlled thin layer onto the molten glass surface of a forebay extension or dog house of a glass furnace.

It is an additional object of this invention to provide apparatus that continually moves the charge materials in the form of a uniform, relatively thin layer, toward and into the melting chamber of the furnace.

It is another object of this invention to provide a feeding apparatus whereby the normal tendency for the surface portions of the molten glass in the forebay extension to flow outwardly away from the furnace is reversed and the fresh charge materials are fed either continually or in regulated increments onto the molten glass surface while the glass in such surface portions is traveling inwardly towards the furnace and, due to its increased viscosity in such portions, acts as a carrier for the charge materials.

Other objects and advantages will be more fully apparent as the description proceeds.

We have found that it is possible to establish an inward flow of the glass immediately adjacent the surface of the melt in the feeding zone or forebay contrary to the normal tendency for outward flow of glass in the surface portions thereof provided a tractive force is applied to the glass in such surface portions and such force is continually maintained in an advancing direction toward the melting chamber inlet. It has also been observed that in applying this force the tendency of the relatively cool glass in this surface portion to cohere and move in a current, once the advancing movement is established, is not interrupted.

More specifically, we have found, that if the driving force is applied in such a manner as to set up tractive action between the propelling means and the more coherent glass layer at the surface of the melt in the feeding zone, an inward flow (toward the melting chamber) can be established and maintained not only in the portions of the glass layer immediately subjected to the tractive action but also that it extends over the whole surface of the glass to the rear of the point of application of the tractive force as well as in front of the point of application of the tractive means.

The invention will be more particularly described in conjunction with the accompanying drawings, in which;

Fig. 1 is a side view, partly in section of a forebay provided with a feeding apparatus constructed in accordance with the present invention;

Fig. 2 is a part end view taken along line 2—2 of Fig. 1;

Fig. 3 is a horizontal view partly in section taken along line 3—3 of Fig. 1;

Fig. 4 is a side elevation of a modified form of the feeding cylinder;

Fig. 5 is a side view partly in section through a modified form of the hopper and the feeding cylinder of the present invention;

Fig. 6 is a side view partly in section through a forebay provided with a further modified form of the feeding apparatus of the present invention; and Fig. 7 is a diagrammatical side view of a modified construction.

Referring to the drawings in detail the invention as illustrated is embodied in a feeding apparatus located above the forebay extension 10 of a glass melting furnace 11. The forebay is in communication with the furnace tank by means of an opening 12 in the side wall 13. The extent of the opening is regulated by a vertically movable refractory arch 13. The molten body of glass 14 in the forebay extension is a continuation of the molten bath in the furnace. A feeding hopper 16 having downwardly inclined side walls 17 and 18 is positioned above the forebay so that material fed therefrom will be delivered along a line spaced inwardly from the end wall 19 of the forebay. The hopper is shown as supported by a front cross-beam 20 and a rear cross-beam 21.

A water cooled feeding cylinder 23 is secured to a horizontally extending shaft 24 mounted in bearings 25, 25 supported on the side walls of the forebay. The feeding cylinder is provided with a plurality of spaced longitudinally and radially extending flanges or blades 28, and is so positioned relative to the hopper 16 that the lower opening of the hopper is operatively closed by the cylinder and a hollow guide plate 29 which is mounted at an angle behind the cylinder and below the hopper opening in such a position that the flanges of the cylinder during rotation will establish a more or less close clearance with respect to the lower end of the guide plate.

Connections for water cooling the hollow guide plate are provided by an inlet pipe 30 on one side and an outlet pipe 31 on the opposite side. Each of these pipes is bent to form a short section 27 which is parallel to the longitudinal axis of the cylinder 23 and is securely attached to the upper end of the guide plate and a long section 32 which is at right angles to the short section 27 and extends rearwardly to be connected to a water system (not shown) or other source of a cooling medium. The guide plate though securely fastened to the short pipe sections may rotate about the longitudinal axis passing through these two pipe sections by moving the distal ends of the long sections. The short pipe sections are in turn supported by hooks 33, 33 which are adjustably secured in slot 34 to the side walls of the hopper. Angle irons 35 are secured on each side of the hopper at points spaced rearwardly of slot 34. Securely fixed to each angle iron is a pair of parallel spaced vertical flat metallic strips 36 which are provided near their lower ends with aligned openings 38. The long pipe sections 32 at an intermediate point rest on a pin 39 which passes through an associated pair of the openings 38. It will be appreciated that the pins may be raised or lowered in the various openings so as to adjust the height of the pipes. Toward the distal end of each long pipe section there is mounted a counterweight 40 which is slidably adjusted along the length of the pipe. The distal ends of these long pipe sections will be attached to flexible hose or other means whereby the pipe will be free to rotate in an arc about the pins 39.

Immediately in front of the hopper 16 is a closed zone formed by a pair of spaced refractory side plates 41 and a cover plate 43 which rests upon the side plates 41, the front beam 20 and the arch 13. The cover plate 43 is shown as provided with openings 44 having nozzles 45 passing therethrough. These nozzles are connected through piping 46 to a source of compressed air (not shown).

Fig. 4 discloses a cylinder having modified flanges. The flanges 48 in this modification are provided with spaced notches 49 to reduce the effects of expansion exerted on the cylinder due to the changes in temperature experienced when approaching and leaving the molten glass surface. The notches are staggered in successive flanges to minimize any leakage of charge materials through the notches.

A modification of the guide plate is shown in Fig. 5. In this figure the hopper 50 is mounted as shown in Fig. 1 on cross-beams which in this case are vertically adjustable. The guide plate 51 is integral with the rear hopper wall, arcuate-shaped and substantially concentric with the cylinder 53. The cylinder 53 is mounted so that it may be horizontally adjusted in order to regulate the space between the guide plate 51 and the cylinder, within rather narrow limits, of course, since the charge material must never pass freely through the space.

In the operation of the apparatus as shown in cross-section in Fig. 5, it will be noted that the hopper is filled with charge materials 54 which are withdrawn from the hopper by the flanges 55 and follow the arcuate path described by guide plate 51. They are then fed in increments continuously deposited onto the surface of the molten glass 14. Due to its position beneath the hopper 50 and its proximity to the arcuate guide plate 51, the feeding cylinder and its associated blades or flanges serve to control the downward flow of the charge materials through the hopper so that each increment of charge is deposited on the glass surface without any substantial tendency to be forced down into the body of the molten glass by the weight of superposed portions of the charge materials remaining in the hopper. This is true even though a slight space is left between the outer ends of the flanges and the arcuate guide plate 51 and is insured by providing the arcuate path substantially out of line with the hopper opening and disposing the feeding cylinder so that it resists the downward thrust due to the weight and tendency to flow of the comminuted charge materials present in the hopper. The apparatus works more efficiently when the distance between the lower edge or lip of the guide plate 51 and the molten glass surface is somewhat less than the thickness of the layer of charge material that is formed directly beneath and in front of the feeding cylinder. Otherwise the charge material may tend to flow out rearwardly behind the arcuate guide plate and interfere with the smooth forward movement of the surface portions of the molten glass and of the layer of charge materials deposited thereon by the action of the feeder. The rate of feed of the charge materials being fed and the thickness of the layer may be adjusted in various ways; for example, by adjusting the distance between the arcuate guide plate and the feeding cylinder and by adjusting the speed of the cylinder. The arrangement of the arcuate guide plate 51 may be still improved by rotatably connecting its upper longitudinal edge to the corresponding lower edge of hopper 50. Such arrangement has been diagrammatically exemplified in Fig. 7 and may be considered as a combination of various features from Figs. 1, 5 and 6. Therefore the different parts shown in Fig. 7 have been numbered 23', 24', 28', 29', 32', 36', 38', 39', 40', and 50', the rotatable connection between 29' and 50' being numbered 33'.

The rotatable arcuate guide plate 29' may be water cooled, the same as guide plate 29 in Fig. 1.

It is a further and important aspect of the operation of the device that the feeding cylinder and its associated flanges or feeding blades 55 exert a tractive action on the surface portions of the molten glass bath due to the continuous one-way movement of the cylinder and the pressure applied on the molten glass surface through the interposed layer of charged materials being continuously deposited thereon by the feeder. At the starting of the feeding installation the quantity of materials fed through the hopper is relatively small and the feeding blades of the feeding cylinder will but slightly touch a thin layer of composition deposited on the glass bath surface, thus progressively propelling the surface glass film through the intermediary of said thin layer. As soon as the movement has been initiated in this manner, the thickness of the layer of composition is increased by increasing the quantity of material fed through the hopper.

Under the influence of the heat, said layer tends to coagulate before completely melting to form a sort of monolith which, as it is propelled by the feeding cylinder carries with it the surface glass film of the bath and thereby automatically keeps up the movement of the same. Continuance of the forward movement is maintained by reason of the continued application of a tractive force by the feeder and its associated blades directly upon the freshly deposited layer of charge and indirectly therethrough upon the surface portions of the molten glass immediately beneath the feeder.

In starting up and even during normal operation the feeding cylinder may be so disposed relative to the surface level of the molten bath that the outer extremities of the feeding blades 55 touch or bear slightly upon the somewhat chilled or more highly viscous surface portions of the bath. However, normally it is preferred that the relative dispositions of the feeding cylinder and the bath level shall be so adjusted as to maintain more or less clearance between the outer extremities of the blades and the bath surface, and, in fact, this spacing may be substantial once the operation becomes well established. By so operating, of course, the freshly charged materials serve to insulate and protect the blades from the extreme temperatures of the bath.

In general, the operation of the feeder as embodied in Fig. 1 is the same as that described in regard to Fig. 5. Likewise, a change in the rate of feed and the thickness of the layer may be brought about by adjusting the speed of the feeding cylinder 23. Alternatively, the distance of the guide plate 29 from the cylinder 23 may be varied by adjusting the counterweights 40. Vertical adjustment of the guide plate as a unit may be made by simultaneously adjusting the pins 39 and the hooks 33. It will be appreciated that many variable adjustments may be made through various combinations of the counterweights, pins and hooks. As pointed out in regard to Fig. 5, the lower end of guide plate 29 should be below the top level of the charge material in front of the feeding cylinder 23. The resulting distance between the lower edge of the guide plate 29 and the bath surface serves to prevent the materials coming from the hopper to spread, by natural sloping rearward beyond the region influenced by the feeding cylinder.

It will be further appreciated that with the modification shown in Fig. 1 if an oversize lump of material should reach the feeding cylinder which normally could not pass through and which would tend to cause damage to the apparatus, it may pass through this modification without damage to the equipment since the guide plate 29 may be so balanced by the counterweights 40 as to be responsive to excessive pressures. The guide plate would then rotate on the axis of the short pipe section 27 by overcoming the force of the counterweights 40 and lift them momentarily while the lump passed through and thereafter the guide plate would immediately recover its normal position.

It will be noted that adjustment of the feeding cylinder speed in either Fig. 1 or 5 will cause a change both in the quantity of charge materials fed to the molten glass surface and in the speed of the countercurrent induced by the feeding cylinder. However, the rate of feed of the charge materials may be adjusted by changing the distance of the cylinder from the guide plate 29, 29', or 51 while the cylinder speed remains constant. Various other combinations are also possible.

Under some conditions of operation a slight overpressure may be established in the melting chamber of the furnace causing combustion and hot gases from the melting chamber to pass out into the forebay extension and come into contact with the feeding apparatus. Such hot gases tend to cause oxidation and thereby damage the feeding apparatus. To obviate this drawback it has been found useful to create a slight overpressure of air in the space between the feeding apparatus and the movable arch 13 adjacent the melting chamber. This may be done in various ways. For example, we have enclosed this space and introduced a continuous supply of cold air through nozzles 45 from an outside source. By appropriately regulating the volume and pressure of the air so introduced, the tendency of the hot combustion gases to escape into the forebay extension may be suppressed or reduced with reduction of their temperature because of their intermingling with the cold air. Similarly, the introduced cold air will tend to maintain the feeding apparatus relatively cool and prolong its useful life.

In Fig. 6 there is shown a feeder generally similar to that illustrated in Fig. 5 but wherein the hopper 60 is positioned still more directly over the feeding cylinder 61 with the back wall of the hopper provided with an arcuate extension 62 which serves as a guide plate, and wherein a close clearance relation is maintained between the feeder blades 63 and the guide plate 62. As shown, the solid charge materials are brought to the hopper by a suitable charging bucket 64 which may be supported from a traveling crane (not shown).

It will be understood that in all three of the embodiments shown, the feeding cylinder is connected by suitable gearing to appropriate driving means and the rotation of the cylinder is positively controlled so that the downward thrust due to the weight of the charge materials stored in the hopper has no influence on the rate of rotation of the feeding cylinder.

As previously pointed out, the apparatus described herein can be regulated to supply continuous increments of charge materials to the molten glass surface in the form of a relatively thin layer without forcing the charge below the surface of the molten glass. The increments are formed and fed onto the glass surface by the feeding cylinder in a controlled and positive manner within a minimum of downward thrust or pressure, and without any material difference in the amount of pressure applied to the bath surface because of differences in the quantity of charge materials stored in the feeding hopper above the level of the feeding cylinder. At the lowest point reached by the feeding blades their outer edges barely touch or come relatively close to what would be the molten surface if charge materials were not being fed thereon. Generally the blades will lightly touch the molten glass as the apparatus is being started but will be slightly spaced therefrom after the layer of charge materials is formed and the continuous current flow initiated. This serves to insulate the flanges from direct heat of the molten glass. In either event however traction is supplied to the molten glass, i. e., directly or through the medium of the layer of charge material which tends to cohere to the molten surface.

In actual practice it will be appreciated that there is a sharp distinction between the molten glass and the solid charge materials only for an instant when the charge materials first contact the molten surface. Thereafter, the charge materials first tend to coalesce by melting at the outer surface to form a coherent mass whereafter they melt progressively as they advance in the furnace.

This point of complete fusion of the charge materials is visibly indicated in the furnace by a line of froth which always remains approximately at the same place when constant working conditions are maintained. Prior to incorporation of the present feeding apparatus the furnaces with which we were familiar were charged manually. With the present apparatus the froth line is about three meters nearer the charging point than when the feeding was manually done. This demonstrates the increased capacity of the furnaces and also that the molten glass reaches homogeneity quicker.

Ordinarily the feeding of charge materials into a forebay causes considerable dust which contains flux compounds from the charge materials. The dust and flux compounds tend to deposit on the refractory structure of the furnace and cause premature deterioration thereof. However, in the present invention where the charge materials are placed lightly on the molten surface in a relatively thin layer which begins immediately to melt, there is no dust formation and consequent deterioration of the equipment.

Although the tractive force is applied at one point it establishes a countercurrent flow over the whole surface of the glass behind the feeding cylinder and in front of the feeding cylinder to the line of froth previously described.

This method and apparatus makes possible very substantial economies and improvements over glass melting practices in use heretofore. A substantial increase in the melting capacities of given furnaces and substantial savings in fuel costs per weight of glass melted have been achieved. There is also a greater uniformity of the molten glass produced and less rapid deterioration of the feeding equipment. Further, there is less wear and tear on the melting furnace due to lessened tendency to dust formation and more efficient utilization of the heat developed by the burners, it being applied more effectively to the melting of the charge rather than in heating the refractory side walls and roof.

It is to be understood that the apparatus set forth herein is merely illustrative of the invention and that, within the scope of the appended claims, the invention may be practiced in various other ways that will readily suggest this to the person versed in the art.

We claim:

1. An installation for feeding vitrifiable materials to a glass melting tank including a forebay extension of said tank for holding a body of molten glass in communication with the main body of molten glass contained in said tank, unidirectionally movable traction means supported above the normal bath level in said extension for continuously applying a tractive force to the upper surface of the molten glass present in said extension in an advancing direction to thereby establish and maintain a continuous current flow at and adjacent the surface of the bath in said extension in the direction toward the main body of glass in said tank, and feeding means positioned in cooperative relation to said traction means lengthwise of said forebay extension for depositing a layer of vitrifiable material on the molten glass in said extension at a location subjected to said continuous flow and adjacent the portion of the glass surface being acted on by said traction means, said feeding means including a hopper and a guide plate associated with a wall of said hopper, said guide plate being downwardly and forwardly inclined toward said tank and having its lower end positioned adjacent the normal level of the molten bath in said forebay extension, said plate cooperating with said traction means to form adjacent the molten bath level a feeding slot opening towards the inlet to the furnace and acting to retard and regulate the downward flow of charge materials from said hopper to the surface of said molten bath.

2. An installation as claimed in claim 1 wherein said guide plate is hollow and provided with connections for circulation of a cooling medium therethrough.

3. An installation as claimed in claim 1 wherein said guide plate is mounted so as to be adjustable toward and away from said feeding cylinder.

4. An installation as claimed in claim 1 wherein said guide plate is biased toward a predetermined position with respect to said cylinder and is yieldable under excessive pressures to permit temporary widening of said feeding slot.

5. An installation for feeding vitrifiable materials to a glass melting tank including a forebay extension of said tank for holding a body of molten glass in communication with the main body of molten glass contained in said tank, a rotatable feeding cylinder carrying radially extending feeding blades mounted above the bath level in said forebay extension, a guide plate positioned adjacent one side of said cylinder and cooperating therewith to define a restricted feeding passage for charge materials passing from a source of supply to said bath, said cylinder being so disposed with relation to said guide plate as to bring the feeding blades thereon into close relation to said guide plate and thereby restrict free gravitational flow of charge materials between said guide plate and said feeding cylinder, said feeding cylinder being further disposed with relation to the normal bath level in said extension so as to apply a tractive force to the upper surface of the molten glass in said extension in an advancing direction to thereby establish and maintain a continuous current flow at and adjacent the surface of the bath in said extension in the direction toward the glass melting tank.

6. An installation as claimed in claim 5 wherein the space above the bath in the forebay extension intermediate said feeding cylinder and the entrance to said melting tank is substantially enclosed and means are provided for introducing air therein at a higher pressure than the air in said tank.

7. An installation for feeding vitrifiable materials to a glass melting tank including a forebay extension of said tank for holding a body of molten glass in communication with the main body of molten glass contained in said tank, a rotatable feeding cylinder carrying radially extending feeding blades mounted above the bath level in said forebay extension, a feeding hopper positioned above said cylinder, an arcuate guide plate extending downwardly from a rear wall of said hopper in concentric relation to said feeding cylinder and cooperating therewith to define an arcuate feeding slot for passage of charge materials from said hopper to the bath in said forebay extension, said feeding cylinder being so spaced laterally with respect to said arcuate guide plate as to bring the feeding blades carried thereby into close relation to said arcuate wall section so that charge materials being fed downwardly through said feeding slot are substantially separated into increments, and said feeding cylinder being further disposed with relation to the normal bath level in said extension so as to apply a tractive force to the upper surface of the molten glass and charge materials in said extension in an advancing direction to thereby establish and maintain a continuous current flow at and adjacent the surface of the bath in said extension in the direction toward the glass melting tank.

8. An installation as claimed in claim 7 wherein said arcuate guide plate is hollow, pivotally mounted at its upper end, and provided with connections for circulation of a cooling medium therethrough.

References Cited in the file of this patent

UNITED STATES PATENTS

| Number | Name | Date |
|---|---|---|
| 1,623,057 | Kingsley | Apr. 5, 1927 |
| 1,822,705 | Mambourg | Sept. 8, 1931 |
| 1,916,262 | Good | July 4, 1933 |
| 2,212,358 | Weekley | Aug. 20, 1940 |